Dec. 17, 1968  F. J. MAURER  3,416,948
HAIR OIL-RESISTANT TOP COATING FOR PLASTICIZED
POLYVINYL CHLORIDE SHEETING
Filed April 21, 1965

INVENTOR
Francis J. Maurer
BY McCoy, Greene, Medest
& Le Grotenhuis
ATTORNEYS

United States Patent Office 3,416,948
Patented Dec. 17, 1968

3,416,948
HAIR OIL-RESISTANT TOP COATING FOR PLASTICIZED POLYVINYL CHLORIDE SHEETING
Francis J. Maurer, Tallmadge, Ohio, assignor to The General Tire & Rubber Company, Akron, Ohio
Filed Apr. 21, 1965, Ser. No. 449,758
2 Claims. (Cl. 117—76)

ABSTRACT OF THE DISCLOSURE

A flexible, laminate sheeting of a fabric backing, plasticized polyvinyl chloride layer, a polymethylmethacrylate barrier layer and a top layer of polyesterurethane.

This invention relates to the preparation of a flexible laminate and more particularly to the preparation of a plasticized polyvinyl chloride laminate.

It has been found that, although laminates comprising a plasticized polyvinyl chloride film possess the desirable characteristics of being inert, flexible, attractive and easily cleanable, such laminates are deficient in maintaining their plasticity due to extraction or volatilization of the polyvinyl chloride plasticizer from the film. Once the polyvinyl chloride plasticizer has been removed from the polyvinyl chloride film, and consequently removed from a laminate comprising the polyvinyl chloride film, or layer, the laminate becomes less flexible, and even hard and brittle. Polyvinyl chloride plasticizer extraction is especially troublesome when the laminate comprising the polyvinyl chloride layer is used in a covering, such as an upholstery covering which receives an excessive amount of wear through rubbing.

In addition, the problems encountered in maintaining the plasticity of polyvinyl chloride laminates have not been entirely in the nature of preventing the extraction of polyvinyl chloride plasticizer. Difficulties have also arisen because of the migration of undesirable solvents and oil, such as hair oil, through the outermost portions of the laminate to attack the innermost portions of the laminate. Although various methods have been devised to counteract the polyvinyl chloride plasticizer, solvent and oil migration, none have proven completely satisfactory.

Accordingly, it is an object of the present invention to provide a polyvinyl chloride laminate which maintains its flexibility upon aging and continual use.

This and other objects of the present invention will be apparent from the specification, claims and appended drawing in which:

According to the present invention, it has been discovered that a laminate comprising (a) a polyesterurethane outer layer, (b) a polymethylmethacrylate barrier layer, (c) a plasticized polyvinyl chloride composition layer and (d) a fabric backing is resistant to polyvinyl chloride plasticizer and to attack by solvents and oils. It has been found that the polyesterurethane layer is less subject to attack by polyvinyl chloride plasticizer, oil and solvent due to its crosslinked structure.

Figure 1:
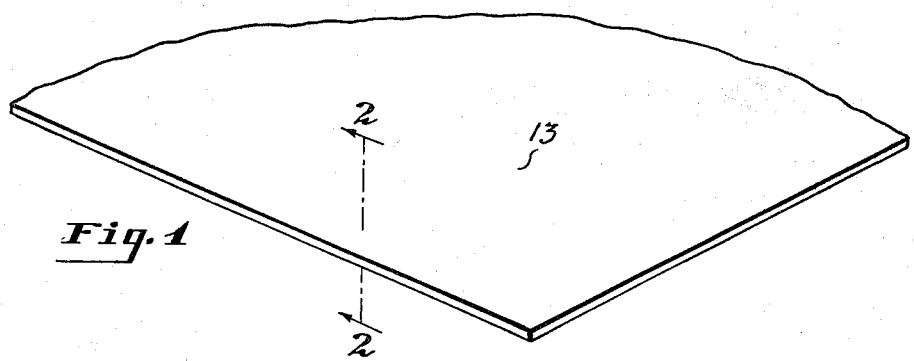
FIGURE 1 is a perspective view of a polyvinyl chloride laminate made in accordance with the present invention.
Figure 2:
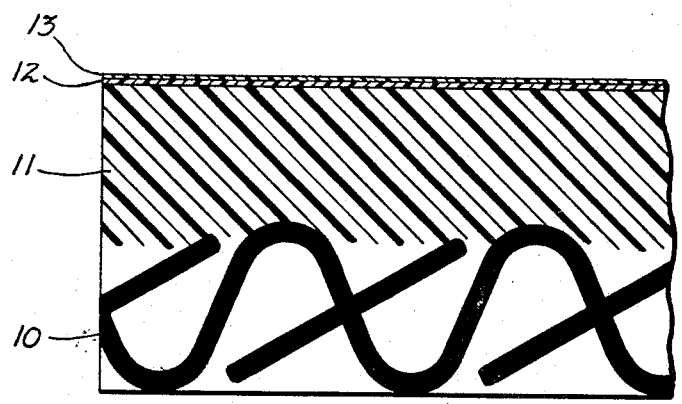
FIGURE 2 is an elevated sectional view taken along lines indicated as 2—2 in FIGURE 1.

Referring more particularly to the drawing, FIGURES 1 and 2 show an upholstery covering comprising a fabric backing 10, a plasticized polyvinyl chloride layer 11 and a central barrier layer 12 of polymethylmethacrylate interposed between polyvinyl chloride layer 11 and an outer layer 13 of polyesterurethane. Barrier layer 12 inhibits oil and polyvinyl chloride plasticizer migration. Further, in accordance with the present invention, it has been found that the polyesterurethane layer prevents the migration of solvents and oil into the laminate and also retards the extraction from the laminate of any polyvinyl chloride plasticizer that may have worked through the barrier layer 12.

Laminates of the invention can be prepared by coating the plasticized polyvinyl chloride layer on the fabric backing and thereupon, after fusing the plasticized polyvinyl chloride layer, roller coating or spraying the polymethylmethacrylate barrier layer on the plasticized polyvinyl chloride layer. After drying, the polyesterurethane layer is applied to the polymethylmethacrylate barrier layer by means of a roller coater or by spraying.

Alternatively the laminate may be prepared by applying the polyesterurethane layer to a release paper and thereupon applying the polymethylmethacrylate barrier layer, plasticized polyvinyl chloride layer and fabric backing. The release paper is subsequently removed.

Although the polyesterurethane layer is desirably the outermost or the top layer, it is posible to superimpose other layers of various materials, such as suede, on the polyesterurethane layer. Also, if desired, it is possible to omit the fabric backing.

Polyesterurethane layer 13 is a polyesterurethane prepolymer (a polyester and an organic diisocyanate in an amount of about 2 equivalents of diisocyanate and 1 equivalent of polyester), a solvent soluble resin having active hydrogen atoms for crosslinking, a tin catalyst, pigment, organic solvent and if desirable, a flattening agent.

Organic diisocyanates used in making the polyesterurethanes are aliphatic diisocyanates having from 6 to 10 carbon atoms, especially in a straight chain between the isocyanato radicals. Examples of such are hexamethylene diisocyanate and decamethylene diisocyanate. In addition to straight chain diisocyanate, cycloaliphatic diisocyanates such as cyclohexylene diisocyanates can be used. If discoloration is not a problem, aromatic diisocyanates can be used, such as 2,4- and 2,6-tolylene diisocyanate and methylene bisphenyl diisocyanate. Mixtures of isocyanates can be used.

Polyester used in making the polyesterurethane should have at least two OH groups and have an average molecular weight of from about 2000 to 2400. The polyester is made by reacting an excess molar amount of a glycol such as one having from 2 to 6 carbon atoms in a straight chain between OH groups, such as ethylene glycol, 1,4-butylene glycol, propylene glycol, dipropylene glycol, 1,6-hexane diol and mixtures thereof with a dicarboxylic acid having from about 4 to 8 carbon atoms in a straight chain between COOH groups. Examples of suitable acids are adipic acid, azelaic acid and sebacic acid. A very useful polyester is one obtained by reacting an excess of a mixture of 60 mole percent ethylene glycol and 40 mole percent 1,4-butylene glycol with adipic acid.

Polyesterurethane prepolymer is made, as aforementioned, by reacting about 2 equivalents of an organic diisocyanate with about 1 equivalent of polyester. The average molecular weight of the resulting polyesterurethane prepolymer is from about 2500 to 3500. The prepolymer has a free NCO content of from about 1 to 7 weight percent based on 100 parts by weight prepolymer. Excess NCO provides crosslinking. Very little or no excess NCO remains after a few days. In place of the prepolymer composition, all of the necessary ingredients can be supplied separately or in certain combinations to a mixing head and discharged together in a "one-shot" step.

Solvent soluble resin having active hydrogen atoms to be used in crosslinking the prepolymer can be any resinous substance which when free of solvent at room temperature is a hard, tough material. It must be soluble in volatile organic solvents, as low molecular weight ketone solvents or mixtures of such ketones and aromatic solvents. Examples of such solvents are methyl ethyl ketone, methyl isobutyl ketone and toluene. The resin should contain from about 1 to 7 percent by weight based on 100 parts by weight prepolymer of active hydrogen as OH and/or COOH groups. Examples of resins are cellulose acetate butyrate, a terpolymer of about 86 percent vinyl chloride, 13 percent vinyl acetate and 1 percent maleic acid or other dibasic acid, a copolymer of vinyl chloride and beta hydroxy ethyl acrylate, or a terpolymer of vinyl chloride, methylmethacrylate, and beta hydroxy propyl methacrylate. Still other useful types of resins to employ are the phenoxy resins (end treated condensation products of bisphenol A and epichlorohydrin). The resin is used in amounts of from about 10 to 150 parts by weight per 100 parts by weight of the prepolymer.

A tetravalent organic tin salt catalyst, soluble in the composition, is used to promote the desired rate of crosslinking. While other organometallic compounds can be used they are slower curing at the higher levels of catalyst content and give lower tensile strength and tear resistance to the polyesterurethane. Examples of useful tin catalysts are dibutyl tin dilaurate and dioctyl tin dilaurate, and mixtures thereof. Other catalysts such as a divalent organic tin salt catalyst as tin octoate can also be used in the present invention. Catalyst can be used in amounts of from about 0.05 to 0.50 part by weight based on 100 parts of prepolymer.

Various finely divided pigments and/or fillers that can be used in the composition such as calcium carbonate, silica, calcium silicate, phthalocyanine green, phthalocyanine blue, iron oxide, titanium dioxide, carbon black, bone black, chrome yellow and toluidine reds. The titanium dioxide is used for opacity while silicas are used for flattening. From about 1 to 10 parts by weight of the black pigments are used per 100 parts by weight of the prepolymer, while from about 10 to 30 parts by weight of the other pigments are used per 100 parts by weight of the prepolymer. Mixtures of pigments can be used.

Organic solvents are used to obtain a coating solution having a solids content for the composition of about 10 to 50 weight percent. Useful solvents are low molecular weight alkyl ketones such as acetone, methyl ethyl ketone, methyl isobutyl ketone, diethyl ketone, diisobutyl ketone. Aromatic solvents as benzene and toluene can be used as diluents. Mixtures of solvents can be used. In some cases, low molecular weight esters or mixtures of esters can be used as alternative solvents. Examples of such esters are ethyl acetate and butyl acetate.

Flattening agents such as silica, silica aerogels and calcium silicate can be used to improve the texture of the polyesterurethane layer. The flattening agent is generally used in amounts of from about ½ to 25 parts by weight based on 100 parts of the prepolymer. For example, from about ½ to 10 parts of flattening agent give bright to semi-bright finishes. While from about 15 to 25 parts give dull finishes. However, the brightest surfaces are obtained without the use of a flattening agent.

Barrier layer 12 is formed from a solution of polymethylmethacrylate, generally a solution of about 5 to 25 percent solids in a suitable organic solvent, such as a mixture of methyl ethyl ketone and toluene. More than one coat of the polymethylmethacrylate layer is often desirable. Polymethylmethacrylate provides the best barrier layer, but part of the polymethylmethacrylate can be substituted by an ester of an alpha-beta unsaturated organic acid having less than 6 aliphatic carbon atoms, including esters of acrylic acid and methacrylic acid such as polymethylacrylate, polyethylacrylate, poly n-butyl acrylate, poly n-butyl methacrylate and polyethyl methacrylate. It is preferred to use any mixture of polymethylic or polyacrylic acid esters containing at least 50 percent by weight of polymethylmethacrylate. It has been found that a barrier layer of polymethylmethacrylate prevents polyvinyl chloride plasticizer loss.

Polymethylmethacrylate can be used in blends of polyvinyl chloride resin or its copolymers such as vinyl acetate. Hydrolyzed vinyl chloride-vinyl ester copolymers can also be used. An example is a hydrolyzed vinyl chloride-vinyl acetate copolymer. A useful barrier layer is one of about 75 parts by weight polymethylmethacrylate and 25 parts by weight of the aforementioned hydrolyzed vinyl chloride-vinyl acetate.

Copolymers of methlmethacrylate can also be used. Examples of comonomers are methylacrylate, ethylacrylate, n-butyl acrylate and n-butyl methacrylate. The copolymer should contain a minimum methylmethacrylate content of at least about 50 percent by weight.

Plasticized polyvinyl chloride composition is illustrated as follows:

| Ingredients | Parts by weight |
|---|---|
| Polyvinyl chloride | 100 |
| Dioctyl phthalate | 40 |
| Dioctyl adipate | 20 |
| Paraplex G–62 (an epoxidized soya bean oil) | 5 |
| Barium-cadmium stabilizer | 2 |
| Filler (calcium carbonate) | 13 |

The polyvinyl chloride may be substituted by copolymers vinyl chloride and vinyl acetate having 85 to 99 percent combined vinyl chloride, polyvinylidene chloride and copolymers of vinylidene chloride and vinyl chloride.

Fabric backing of the invention can be formed of fibers of linen, nylon, cotton, rayon, silk, wool, or a polyester (Dacron), polyacrylonitrile, modacrylic or other mixtures thereof. The fabric can be woven or non-woven.

The invention is best illustrated by reference to the following examples.

EXAMPLE 1

To a cotton fabric backing was calendered a layer of a flexible plasticized polyvinyl chloride composition having the following composition:

| Ingredients | Part by weight |
|---|---|
| Polyvinyl chloride | 100 |
| Dioctyl phthalate | 40 |
| Dioctyl adipate | 20 |
| Paraplex G–62 (an epoxidized soya bean oil) | 5 |
| Barium-cadmium stabilizer | 2 |
| Filler (calcium carbonate) | 13 |

The ingredients were mixed together by masticating at elevated temperatures of about 200° to 350° F. and calendered onto the fabric backing. The polyvinyl chloride sheet runs formed was coated with a polymethylacrylate solution of the following composition to form, after drying a coating approximately ¼ mil thick on the polyvinyl chloride composition.

| Ingredients | Parts by weight |
|---|---|
| Polymethylmethacrylate (Lucite 41) | 7.5 |
| Partially hydrolyzed vinylchloride-vinyl acetate copolymer (VAGH) | 2.5 |
| Methyl ethyl ketone | 90 |

This layer was dried in an oven for 45 seconds at 175° F. The polymethylmethacrylate formed a barrier layer which, in accordance with the present invention, was then coated with the following polyesterurethane composition.

Part A

| Ingredients | Parts by weight |
|---|---|
| Partially hydrolyzed vinyl chloride-vinyl acetate copolymer (VAGH) | 50 |
| Dry methyl ethyl ketone | 130 |
| Toluene | 20 |
| Barium-cadmium stabilizer (Vanstay W) | 1.1 |
| Stabilizer: Ferro 909 epichlorohydrin-bis-phenol A condensation product | 2 |
| Dibutyl tin dilaurate (D–22) | 0.25 |

Part B

| | |
|---|---|
| Prepolymer, 3.5 percent free NCO of 60/40 polyethylene butylene adipate and hexamethylene diisocyanate | 50 |
| Dry methyl ethyl ketone | 150 |

Part A is mixed with Part B just prior to application to the polymethylmethacrylate barrier layer. After roller coating the polyesterurethane onto the polymethylmethacrylate layer, the resulting laminate was dried in an oven for 45 seconds at 175° F. The laminate was further dried for 24 hours at 25° C. The resulting laminate possessed excellent slip, freedom from tack and excellent flex properties along with improved resistance to solvent, oil and polyvinyl chloride plasticizer migration.

The laminate, as prepared above, was compared to a control laminate similar to the above, except that a standard PVC top finish (62 wt. percent PVC, 38 wt. percent methylmethacrylate) was substituted for the polyesterurethane layer and polymethylmethacrylate barrier.

| | Slip | Tack | Dulling | Adhesion | 1,000,000 flexes |
|---|---|---|---|---|---|
| Polyesterurethane laminate of this invention. | Good | Slight | None | Good | OK. |
| Control laminate (no polyesterurethane layer). | do | Very slight | do | do | OK. |

The control laminate had a 3.61 percent plasticizer loss over a three day period, while the polyesterurethane laminate of this invention had only a 1.11 percent loss over the same period.

EXAMPLE II

The procedure of the previous example was repeated except the partially hydrolyzed vinyl chloride-vinyl acetate copolymer was omitted from the polymethylmethacrylate barrier layer. All other components and procedure were the same. The test results of the resulting laminate were comparable to those of Example I.

EXAMPLE III

The process of Example II was repeated except that 30 parts by weight of polymethylmethacrylate was incorporated into Part A of the polyesterurethane. All other amounts and components were the same. The results were comparable.

What I claim is:
1. A flexible, laminate sheeting comprising (a) a fabric backing, (b) a plasticized polyvinyl chloride layer applied to the fabric backing, (c) a barrier layer comprising polymethylmethacrylate applied to the surface of the polyvinyl chloride layer and (d) an outer layer of a cross-linked polyester-urethane applied to the surface of the polymethylmethacrylate layer.
2. The laminate sheeting of claim 1 wherein the polyester urethane comprises the reaction product of (a) a diisocyanate, (b) a polyester having an average molecular weight of from about 2,000 to 2,400 and (c) a resin, soluble in volatile organic solvents and having from about 1 to 7 percent by weight of active hydrogen groups based on total weight of (a) and (b).

References Cited

UNITED STATES PATENTS 3,075,863  1/1963  Frey _____ 161—254 X

FOREIGN PATENTS 776,087  6/1957  Great Britain.

WILLIAM D. MARTIN, *Primary Examiner.*

R. HUSACK, *Assistant Examiner.*

U.S. Cl. X.R.

117—161; 161—233, 254